Aug. 31, 1965 A. M. SKELLETT 3,204,238
CATHODE RAY TUBE FOR THREE-DIMENSIONAL PRESENTATIONS
Filed July 13, 1962 2 Sheets-Sheet 2

INVENTOR.
ALBERT M. SKELLETT
BY
Eyre, Mann & Lucas
ATTORNEYS

United States Patent Office 3,204,238
Patented Aug. 31, 1965

3,204,238
CATHODE RAY TUBE FOR THREE-
DIMENSIONAL PRESENTATIONS
Albert M. Skellett, Madison, N.J., assignor to Tung-Sol
Electric Inc., a corporation of Delaware
Filed July 13, 1962, Ser. No. 209,721
12 Claims. (Cl. 343—7.9)

The present invention relates to visual displays and more particularly it relates to means for the reproduction of data and objects in three dimensions in the form of light images.

Radar systems of the P.P.I. (plan position indicator) type are well known. These produce a flat map-like image showing objects in their undistorted relative horizontal positions. In certain cases it would be desirable to be able to display elevation of the objects in such images. In fact, in certain applications there is a critical need for such a display, for example, at airports and aircraft carriers where there are many aircraft in the air at various elevations and where on the flat P.P.I. presentation a collision between any two of the aircraft is not readily discernible and, at the present time, must be determined by computation. Therefore, to fulfill this need the present invention provides a radar indicator capable of taking data from a radar set, concerning the position of objects with respect to the radar antenna, and display it in three dimensions relative to a fixed point within the indicator.

The indicator consists of a standard single electron gun cathode ray tube in which the usual substantially flat face of the tube is replaced by a curved tube face in the form of hemispherical dome and the standard stationary translucent screen is replaced by a rotating transparent phosphor screen. The center of curvature of the dome is positioned along the axis of the tube and is the fixed point to which the position of the objects are referenced. The transparent screen rotates around this fixed point, and the tube axis, and, as it rotates, passes through every portion of the volume within the hemisphere to describe or sweep out the volume in the hemisphere. Because of this sweeping out, the electron emission from the electron gun, if it is properly positioned and timed, can produce a light spot at any point within the volume by intercepting the rotating screen as it passes through that point. In effect then, the rotating screen is a dynamic three dimensional screen which fills the hemisphere and may be permeated and activated at any desired point within the hemisphere, by proper positioning of the electron emission from the electron gun and the screen relative to each other. Since both the dome and the screen are transparent they do not appreciably interfere with viewing the light spots produced in the hemisphere in this manner.

To simplify the problem of correctly positioning the emission and the screen relative to each other to produce light spots positioned in accordance with the position of objects with respect to the radar antenna, it is preferable that the orientation of the radar antenna in elevation $\phi$, be a function of its rotation in azimuth $\theta$, and the rotation in azimuth be constant. If the cathode ray tube is then used in a manner similar to a plan position indicator where range is plotted radially from the center of the tube and azimuth is plotted angularly around the center, the images may be positioned within the hemisphere, with respect to the mentioned fixed point in proportion to the range R, of objects detected by the radar and the azimuth $\theta$, and elevation $\phi$ angles of the antenna at the time of detection, by programming the change in elevation with rotation in azimuth into the shape of the screen and rotating the screen at a fixed speed.

For a better understanding of the invention reference may be had to the accompanying drawings of which:

Figure 1:
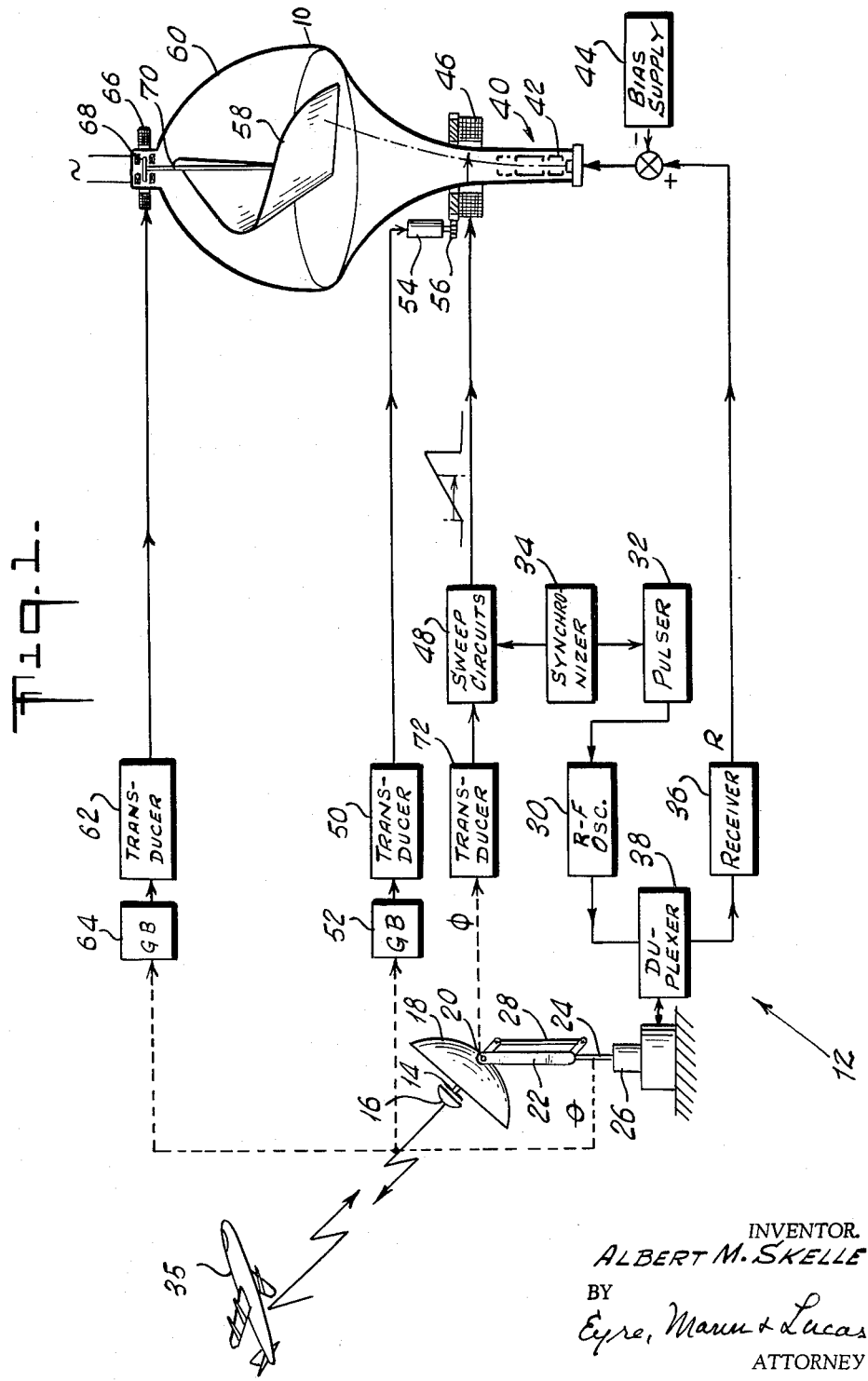
FIG. 1 shows the applicant's invention adapted for use in a radar set for providing information of the position of aircraft relative to an airport.

In the illustrated embodiment, a cathode ray tube 10, incorporating applicant's invention, is shown being used as an indicator in a radar set 12 and is hereafter discussed therewith in order to provide a clearer explanation of its operation.

The radar set 12 includes a dipole antenna 14 mounted at the end of a waveguide section a quarter of a wavelength away from a deflector 16 that directs the radiated energy into a beam forming parabolic reflector 18. To permit positioning of the beam formed by the parabolic reflector, the reflector is fixed to a horizontal shaft 20 which is mounted on bearings in a gimbal 22 that is free to rotate on a vertical shaft 24. A motor 26 continuously rotates the gimbal 22 on the vertical shaft to position the beam in azimuth while a servo mechanism (not shown), mounted within the gimbal, continuously tilts the reflector upwards, through linkage 28, a certain number of degrees with each complete revolution of the gimbal around the vertical shaft to position the beam in elevation. The reflector starts with its mouth vertical so that the beam is scanning the horizon and is continuously tilted upwards a fixed number of degrees each revolution until its mouth is horizontal and the beam is scanning vertically overhead. When the mouth of the reflector is horizontal and the beam is scanning vertically, the servo mechanism returns the mouth of the reflector to the vertical in one revolution of the antenna in azimuth so that the antenna again scans the horizon.

In a practical application, the beam might make ten complete revolutions in azimuth in a second, at the time spiralling upward in elevation 10 degrees with each revolution of azimuth and making the return from the vertical to the horizontal in one revolution of azimuth. If the beam was 10° wide this would mean it would make a complete hemispherical scan of the sky around it every second. To simplify discussion, hereinafter the assembly consisting of the dipole antenna 14, the deflector 16, and the parabolic reflector 18 will be referred to as the antenna, and the direction of the beam will be discussed in terms of, and will be considered synonymous with, antenna direction.

High power pulses of short duration are fed from a radio frequency oscillator 30 to the antenna 14. The magnitude and duration of the pulses are determined by a pulser 32 which modulates the output of the radio frequency oscillator. Control of the repetition rate of the pulser is by way of a synchronizer 34 which periodically triggers the pulser 32 to produce the pulse envelopes.

The pulses are transmitted by the antenna in the direction in which the antenna is then pointing. If there happens to be an echo producing object, for instance aircraft 35, in the path of the pulse as it travels out from the antenna, a portion of the electromagnetic energy of the pulse will be reflected back to the antenna where it is fed to receiver 36. The time delay between the transmitted and received pulses provides a measure of the distance to the echo producing object. The rotation of the antenna has no appreciable effect on the measurements because the propagation of the pulses through the space is at the speed of light and therefore the antenna has moved very little in the time it takes the pulse to be transmitted out and back. A duplexer 38 is coupled between the antenna and the receiver 36 and oscillator 30 to prevent saturation and possible damage of the sensitive receiver by the high energy pulses from the oscillator.

A radar set, as described, will provide the information necessary to determine the position of any echo producing object within a hemispherical portion of the sky whose radius is the reception range of the radar set and whose center of curvature is the position of the antenna. The information is provided in terms of polar coordinates, range R, which is measured by the delay between the initiation of pulse and the reception of its echo by the antenna; azimuth angle $\theta$, which is determined by the orientation of the antenna around vertical shaft 24; and elevation angle $\phi$, which is determined by the orientation of the antenna around horizontal shaft 20.

To reproduce this information in three dimensions an unusual cathode ray tube 10 is provided. This cathode ray tube has a single electron gun 40 whose grid 42 is coupled to the output of the receiver 36 to receive the return pulses. The grid is normally biased below cut-off, by a source of negative bias 44, to keep the tube nonconducting, and when a range pulse of significant magnitude is received from the receiver it drives the grid above cut-off causing electron flow in the tube. In this manner electron flow through the tube is made proportional to the magnitude of the return pulses received from the receiver, and in the absence of return pulses the electron flow is prevented by the negative bias. This type of control over the tube is generally referred to as intensity modulation.

The electron gun 40 aligns the electron flow axially with the tube. To deflect the electrons from the center of the tube a magnetic deflection coil 46 sets up a magnetic field at right angles to the path of the electrons through the tube. When the electrons pass through the field they are deflected by a force which is exerted on them at right angles to both the electron flow and the field. The strength of the field, and therefore the force exerted on the electrons, is controlled by a sweep circuit 48 which provides a sawtooth voltage to the coil 46. This sawtooth is initiated by a pulse from the synchronizer 34 which as has been pointed out, also triggers the pulser 32 to initiate the transmitted radar pulse. The initiating of the transmitted pulse and the sawtooth is timed so that the sawtooth increases the field strength linearly with the delay of the return pulses and therefore deflects the electron flow initiated by the return pulses outwardly from the center of the tube in proportion to the range of the object reflecting the pulses.

To position the beam in accordance with the azimuth of the object reflecting the pulses, the coil 46 is rotated around the tube in synchronism with the rotation of the antenna in azimuth. This is done by mechanically coupling a transducer such as synchro generator 50 through a gear box 52 to the vertical shaft 24 of the antenna and taking the output of the synchro generator and transmitting it to a synchro motor 54 whose shaft is attached to the coil 46 by gearing 56. The gear ratios of gear box 52 and gearing 56 must complement each other, that is, the gearing must be such that the coil 46 is rotated by the synchro motor 54 in synchronism with the rotation of the shaft 24.

If the phosphor screen of the cathode ray tube were flat, translucent, stationary, and arranged substantially perpendicular to the axis of the tube, the image produced by the above arrangement would appear as a standard P.P.I. presentation with no indication of elevation. However, instead of the usual flat, translucent, stationary screen, the screen 58 is curved, transparent and rotates around the axis of the tube at a constant speed inside of a clear glass curved face in the form of a hemispherical dome 60 mounted symmetrically around the axis of the tube.

Figure 2:
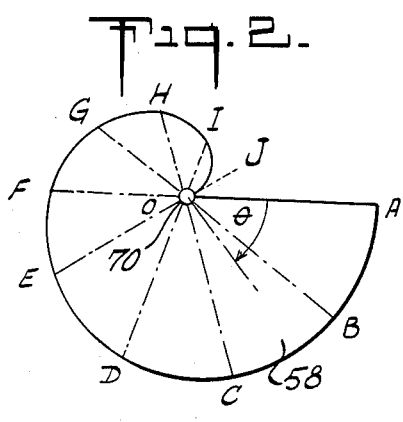
FIGS. 2 and 3 show a top view and a side elevation, respectively, of the phosphor screen in the cathode ray tube shown in FIG. 1.
Figure 3:
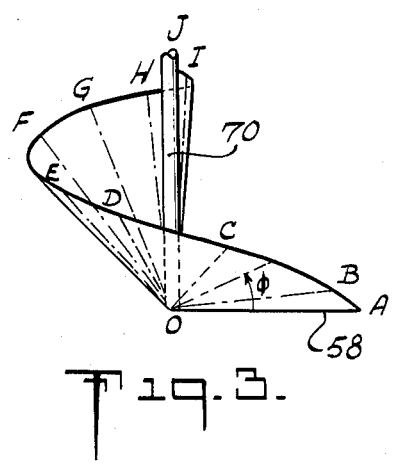

Referring to FIGS. 2 and 3, the screen tilts upward at a constant rate with change in position around the axis of the tube, or axis of rotation, going from perpendicular to the axis of rotation to parallel with the axis of rotation in 324° around the axis. That is, in every 36 degrees around the axis of the face of the screen will increase its tilt by 10° so that along line OA the screen will be perpendicular to the axis, along line OB, displaced 36° clockwise from OA, the screen will be inclined 80° to the axis of the tube and so on until along line OJ, displaced 324° clockwise from OA, the screen will be parallel to the axis of the tube.

To have the line along which the electron beam scans tilt up ten degrees for every revolution of azimuth of the antenna and/or the electron beam, all that is now necessary is to have the line along which the electron beam scans radially on the screen 58 change 36° in azimuth for each revolution of the beam in azimuth. Rotation of the screen at 9/10 the speed of rotation of the coil accomplishes this. To do this a transducer in the form of synchro generator 62 is driven by vertical shaft 24 through ten-to-nine speed reduction gear box 64 and the three-wire synchro data from this generator is fed to the stator 66 of a synchro rotor 68 in the cathode ray tube 10. The shaft 70 on which the rotor is mounted is coupled directly to the screen 58 coincident with the axis of the tube 10 so that the screen will rotate around the axis of the tube in synchronism with the rotation of the shaft of synchro generator 62 or at 9/10 the speed at which the antenna is rotated in azimuth. Therefore with both the antenna and the electron beam rotating clockwise the beam starts scanning along horizontal line OA which lies in a plane with the base of the hemispherical dome. Since the beam is moving faster than the screen, it moves across the screen so that after one revolution it is scanning along line OB tilted up 10° with respect to the horizontal and at the end of nine revolutions it is scanning vertically along line OJ perpendicular to the base plane. For the next 36° back to line OA there is no screen so that while the antenna flips back to scanning along the horizon no images are produced and at the end of ten revolutions the beam is again scanning along line OA.

It may be desirable in some embodiments of the invention not to use synchros, to rotate the screen, to eliminate the possible distortion of the electron beam path by a stray magnetic field. In such cases a motor with a simple two-pole rotor 68 made of soft iron or other material of low magnetic retentivity is used, and the transducer 62 is a pulsing circuit which excites the stator 66 with a single synchronizing pulse once each complete cycle of 10 azimuthal rotations. This pulse would take place during the return from the vertical to the horizontal position of scan when the electron beam is dormant, and the effect of the pulse would be to pull the rotating screen into perfect synchronism with the system.

It is necessary to adjust the actual deflection of the electron beam by the coil 46 so that at all times the beam correctly intercepts the screen. This requires a continuous reduction in beam deflection as the tilt angle $\phi$ increases. To accomplish this a potentiometer 72 mounted on the horizontal shaft 20 decreases the supply voltage to the sweep circuits as the elevation angle of the antenna increases to amplitude modulate the sawtooth as a function of elevation angle of the antenna.

With this arrangement O represents the position of the antenna 14 and the volume swept out by the screen within the hemisphere indicates the portion of the sky scanned by the antenna during one hemispherical scan. The light images produced are then oriented in the dome around O exactly as the objects producing them are oriented around the antenna in the hemispherical portion of the sky scanned by the radar set, where the radial distance from O along the screen to the light image is proportional to the range R, of the object; the tile upwards of the radial distance is equal to the elevation angle $\phi$, and the position of the radial line around the axis at the time the image is produced is equal to the azimuth angle $\theta$.

Figure 4:
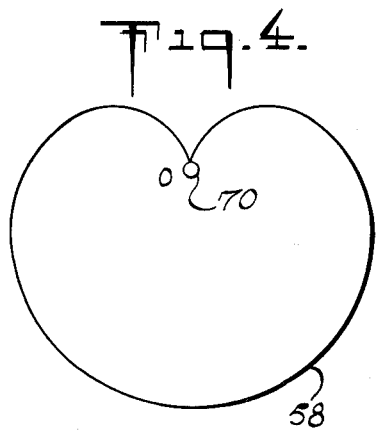
FIGS. 4 and 5 show a top view and a side elevation, respectively, of a screen of a cathode ray tube for an alternate type scan.
Figure 5:
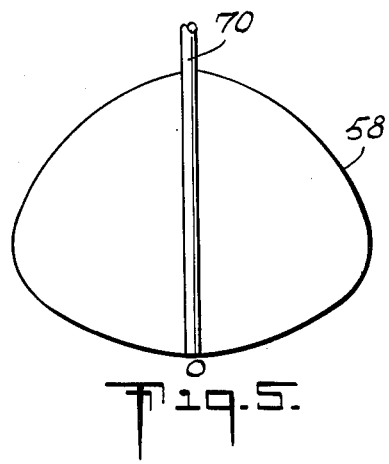

Though the particular scan just described is preferable it is not essential to applicant's invention and the tube 10 may be adapted to other scans by changing both, or either, the shape of the screen 58 and speed at which it is rotated. For instance, if the antenna spiralled slowly back to the horizon at the same rate of its upward spiral, the tube could be adapted by changing the shape of the screen to that shown in FIGS. 4 and 5 and the gear ratio which was nine-to-ten for the screen of FIGS. 2 and 3, would now be nineteen-to-twenty so that the screen would rotate at 19/20 of the speed of rotation of the deflection coil. Obviously other changes could also be made within the spirit and scope of the invention and therefore it should be understood that this is intended to cover all changes and modifications of the described form of the structure herein chosen for the purpose of illustration which do not constitute departures from the spirit and scope of the invention.

I claim:

1. A device for producing light spots at any point within a defined portion of space comprising:
    (a) a screen rotatable about an axis and which is the locus generated by a line one end of which remains fixed at a point along the axis of the screen and the other end of which defines a path which extends around the said axis, the angle of inclination of the line with the axis varying with the position around the axis;
    (b) a means for directing a beam at any selected point on the screen to produce a light spot at that point; and
    (c) a means for rotating the screen relative to the means for directing a beam to sweep out a three dimensional figure defined by the periphery of said screen so that light spots can be produced at any point in that portion of space in said three dimensional figure by the means for directing the beam as the screen passes through that point.

2. A cathode ray tube for reproducing data and objects in three dimensions in the form of light images comprising:
    (a) a screen rotatable about an axis and which is the locus generated by a line one end of which remains fixed at a point along the said axis and the other end of which defines a path which extends around the axis, the angle of inclination of the line with the axis varying with the position around the axis;
    (b) electron gun means which emit electrons that produce light spots on the screen when they hit the screen;
    (c) deflecting means which deflect the electrons to vary the position of the light spots on the screen; and
    (d) means for rotating the screen around the mentioned axis relative to the electron gun means to generate a three dimensional figure so that light spots can be positioned at any point on that portion of space within the generated three dimension figure as the screen passes through that point.

3. The structure of claim 2 wherein the axis of rotation of the screen is in substantial alignment with the path of undeflected electrons flowing from the electron gun means.

4. The structure of claim 2 wherein the angle of inclination with respect to the axis of rotation progressively decreases with change in position on the screen around the axis.

5. The structure of claim 2 wherein the angle of inclination with respect to the axis of rotation alternately decreases and increases with change in position on the screen around the axis.

6. The structure of claim 2 including a transparent hemispherical face on the cathode ray tube mounted symmetrically around the axis of undeflected electron flow.

7. The structure of claim 6 wherein
    (a) the screen is a transparent phosphor screen mounted within the tube face; and
    (b) the three dimensional figure generated by the screen rotation is substantially the interior of the hemispherical face of the tube.

8. The cathode ray tube of claim 2 wherein said path is a spiral path.

9. In a cathode ray tube to be used as an indicator in a radar set with an antenna positionable in elevation and azimuth, where said radar set is adapted to rotate the electron flow within the cathode ray tube with the rotation of the antenna of the radar set in azimuth and to deflect the electron flow radially in proportion to the propagation of signals to and from the antenna, the improvement comprising a phosphor screen rotated around an axis in substantial alignment with the flow of undeflected electrons from the electron gun of the cathode ray tube to generate a three dimensional figure within which light spots produced on the screen by the electrons are positioned in accordance with the range, azimuth and elevation of echo producing objects within the range of the radar set by controlling the rotation of the screen relative to the rotation of the electrons with the rotation of the antenna in azimuth.

10. The structure of claim 9 wherein
    (a) said screen is shaped in accordance with the change in elevation of the antenna with rotation of the antenna in azimuth, the angle of inclination of said screen, with respect to a plane substantially perpendicular to the axis of rotation, varying around the axis of rotation of the screen as a function of azimuth varying linearly around the axis in the plane; and
    (b) said screen moves at a constant speed with respect to the beam.

11. In a radar set which has an antenna which is positionable in elevation and azimuth and which provides electrical signals that are representative of the range of detected objects, a new cathode ray tube indicator for displaying position data of the detected objects in terms of range, elevation, and azimuth comprising:
    (a) a screen the inclination of which with respect to an axis passing through the screen varies with change in position around the axis as the elevation of the antenna of the radar set varies with rotation in azimuth of the antenna;
    (b) electron beam means for producing spots on the screen representative of the objects detected by the radar;
    (c) deflecting field means for deflecting electrons radially so as to position said spots out from said axis as a function of range of the detected object;
    (d) means for rotating said deflecting field means in synchronism with the rotation of the antenna in azimuth so as to position said spots as a function of azimuth of the detected objects; and
    (e) means for rotating said screen out of synchronism with said antenna so as to position said spots along said axis as a function of elevation of said objects.

12. In a radar set which has an antenna that is continually rotated in azimuth at a fixed rate and is changed in elevation a number of degrees with each rotation in azimuth and which provides electrical signals that are representative of the range of detected objects, a cathode ray tube indicator for displaying the position of detected objects in terms of range, elevation, and azimuth comprising:
    (a) a continuous screen in the shape of the locus generated by the movement of one end of a line in a spiralling path while the other end of the line remains fixed at a point along an axis so that the inclination of the screen with respect to the axis varies with change in position around the axis as a function of the change in elevation of the antenna with rotation of the antenna;

(b) electron beam means for producing spots on the screen representative of the objects detected by radar;

(c) deflecting field means for deflecting electrons radially of said axis so as to position said spots out from said axis as a function of the range of the detected objects;

(d) means for rotating said deflecting field means at a fixed rate in synchronism with the rotation of the antenna in azimuth so as to position said spots around said axis as a function the azimuth of the detected objects; and (e) means for rotating said screen at a fixed rate out of synchronism with said antenna so as to position said spots along said axis as a function of the elevation of said objects.

References Cited by the Examiner

UNITED STATES PATENTS

| | | | |
|---|---|---|---|
| 2,637,023 | 4/53 | Peters et al. | 343—7.9 |
| 2,806,216 | 9/57 | Fryklund | 343—7.9 |
| 3,079,585 | 2/63 | Perry et al. | 343—7.9 |
| 3,097,261 | 7/63 | Schipper et al. | 343—7.9 |
| 3,138,796 | 6/64 | Withey | 343—7.9 |
| 3,140,415 | 7/64 | Ketchpel | 343—7.9 X |

CHESTER L. JUSTUS, *Primary Examiner.*